United States Patent [19]

Webb

[11] 4,102,556
[45] Jul. 25, 1978

[54] REAR SUPPORT STRUCTURE FOR A CABINET

[75] Inventor: William M. Webb, Louisville, Ky.

[73] Assignee: General Electric Company, Louisville, Ky.

[21] Appl. No.: 756,236

[22] Filed: Jan. 3, 1977

[51] Int. Cl.² ........................................... F16M 11/24
[52] U.S. Cl. .................................. 312/250; 16/42 T; 280/47.11
[58] Field of Search ............... 5/8, 20; 312/249, 250; 248/188.24, 21–23; 16/42 T; 280/47.11, 47.32

[56] References Cited

U.S. PATENT DOCUMENTS

| | | | |
|---|---|---|---|
| 2,964,778 | 12/1960 | Frey | 5/8 |
| 2,986,746 | 6/1961 | Jackson | 5/8 |
| 3,822,892 | 7/1974 | Browning | 16/23 |
| 3,954,241 | 5/1976 | Carlson | 248/188.8 |

*Primary Examiner*—Casmir A. Nunberg
*Attorney, Agent, or Firm*—Francis H. Boos

[57] ABSTRACT

A rear support structure for a cabinet is disclosed. The support structure includes provision for automatically adjusting the level of the rear of a cabinet to compensate for a supporting surface which slopes from side to side. The support structure comprises mounting means affixed to the rear, underside of the cabinet and extending transversely of the cabinet. In a preferred embodiment, a cylindrical roller having an axial bore therein encircles an axle and is rotatable on the axle to facilitate movement of the cabinet. Either the axle or the bore of the roller or both are arcuate in shape lengthwise of the roller to permit tilting of the roller relative to the axle which in turn permits tilting of the rear of the cabinet with respect to the supporting surface while insuring that the full length of the roller contacts the supporting surface.

In another embodiment, the rear support structure comprises an ellipsoidal member mounted to a channel member affixed to the rear of the cabinet. A flexible track surrounds the ellipsoidal member and has an arcuate internal surface in engagement with the arcuate outer surface of the ellipsoidal member. The track is permitted to tilt relative to the channel member and the ellipsoidal member by the arcuate engaging surfaces to compensate for the side-to-side slope of the supporting surface. The flexible track is movable around the ellipsoidal member to facilitate movement of the cabinet over the supporting surface.

12 Claims, 14 Drawing Figures

REAR SUPPORT STRUCTURE FOR A CABINET

BACKGROUND OF THE INVENTION

1. Field of the Invention

This invention relates to levelling mechanisms for cabinets and, more particularly, to levelling mechanisms for uniformly supporting cabinets, such as refrigerator cabinets, on surfaces which slope from side to side.

2. Description of the Prior Art

Frequently, appliances, such as washing machines and refrigerators, are placed on sloping surfaces. Usually, manually adjustable supports are affixed to the front underside of the cabinets of the appliances. These supports are individually adjustable so that they can be employed for compensating for slope in a supporting surface from front to back and also for slope from side to side. The front supports, usually two in number, must often be adjusted to unequal lengths to compensate for the side-to-side slope in the supporting surface. Where the cabinet has two fixed rear supports, the weight of the cabinet may then cause the cabinet to rock on three of its four supports. This is particularly true of a refrigerator cabinet for it is very heavy when a normal amount of food is stored therein and, if not supported at all four of its corners, it will tend to rock or tilt. Of potentially greater concern, the weight of the refrigerator cabinet may cause twisting of the cabinet to bring all four supports into engagement with the supporting surface. The reason for this twisting is that the refrigerator cabinet is tall and not as rigid as more compact cabinets and tends to twist when loads are put on the cabinet by the food stored therein. This twisting action of the cabinet may cause distortion of the front face of the cabinet against which the door closes and thereby prevents the door gasket from properly sealing against the front face of the cabinet. If the sealing gasket of the refrigerator door does not seal well with the front face of the cabinet, then heat will leak into the refrigerator's food storage compartment and result in inefficient refrigeration and waste of electrical energy. Moreover, in the case of refrigerator-freezers which have two doors, one above the other or side by side, this twisting may prevent the doors from lining up well enough to be aesthetically acceptable.

Since the above-mentioned appliances are heavy and are often placed in confined areas, it is difficult or impossible to provide access to the rear supports for adjusting such supports to compensate for a sloping surface, particularly one which slopes from side to side. Hence, it is important to provide a means for effecting automatic adjustment of a rear support of the cabinet of the appliance to conform to the adjustment of the front supports in order that the cabinet may be uniformly supported, front and back, in an upright position, and to do this without requiring access to the rear supports.

The problem of providing self-adjusting supports for facilitating the levelling of appliances such as refrigerators and washing machines when such appliances are positioned on sloping floor surfaces is well-known, and the prior art discloses many examples of self-adjusting assemblies adapted especially for facilitating the levelling of such appliances without requiring access to the rear supporting structure and without requiring the use of manual procedures or tools. For example, U.S. Pat. No 3,954,241 teaches a self-adjusting assembly especially adapted for facilitating the levelling of an appliance, such as a washing machine or the like, on a sloping floor in order that the appliance be firmly positioned thereon. The assembly includes a pair of brackets located at the two rearmost, lower corners of an appliance, and a flexible cable element extending from one bracket to the other. Each bracket is provided with an independently adjustable leg member, with the members being interconnected by the cable. If both rear legs do not engage the floor, the leg which first engages the floor is forced upwardly by the weight of the cabinet. Through the cable, this causes a corresponding downward movement of the other leg until it is brought into engagement with the floor.

Another example of a support with automatic adjustment is taught by U.S. Pat. No. 3,880,388. The support is of the leg-type, comprising two vertically movable legs coupled together, in one embodiment, by a chain of rigid links encased by a tubular guide. The chain links are arranged such that as the weight of the supported structure causes one leg, which engages the surface upon which the structure is placed, to move upwardly, the other leg is urged downwardly until it engages the surface.

One problem with such prior art self-adjusting leg-type supports is that the mechanism employed is of complex and expensive construction.

In lieu of leg-type supports, some prior art cabinet structures employ a single, rear roller-type support in combination with two adjustable front supports. If a single roller-type support is utilized, it is necessary to provide a roller of reasonable length to assure adequate stability of the rear portion of a cabinet. This is especially important where the supporting surface is a soft floor covering. If the weight of the rear portion of the cabinet is supported on a short roller, this may result in a substantial depression in the supporting surface. Such depression would hinder the moving of the applicance from the confined space. However, where the two front supports are adjusted to unequal lengths on a floor which slopes from side to side and a roller of adequate length is employed, another problem is encountered in that one end of the rear roller may engage the floor covering and tend to press into the soft floor covering.

By this invention, those disadvantages and limitations of the prior art are overcome, and a support for appliances, such as refrigerators and washing machines, is provided which is simple in construction, can be manufactured economically and which readily and automatically adjusts itself appropriately for uniformly supporting the appliance on a surface which slopes from side to side.

Accordingly, it is an object of this invention to provide an improved construction of a rear levelling support for a cabinet whereby the support automatically adjusts itself to a supporting surface which slopes from side to side.

It is another object of this invention to provide such a rear levelling support which insures that the entire length of the support engages the supporting surface, thereby avoiding any concentration of the weight of the rear of the cabinet in a particular area of the supporting surface.

It is still a further object of this invention to provide a rear levelling support which minimizes depressions in a supporting surface and thereby facilitates the moving of an appliance such as a refrigerator cabinet from a confined space.

SUMMARY OF THE INVENTION

This invention is directed to a self-adjusting, cabinet rear support structure for uniformly supporting a cabinet on a supporting surface which slopes from side to side. The support structure includes an axle affixed to the rear, underside of the cabinet and extending transversely of the cabinet. A cylindrical roller having an axial bore encircles the axle and engages the supporting surface beneath the refrigerator cabinet. The roller extends several inches transversely of the refrigerator cabinet and is positioned about the axle in such a manner as to allow tilting of the roller relative to the axis and thereby cause the roller to engage the supporting surface along the entire length of the roller. This avoids any concentration of the weight of the cabinet in a particular area of the supporting surface. The surface of the bore or the surface of the axle or both are arcuate in shape to permit the tilting of the roller relative to the axle so that the entire length of the roller engages the supporting surface despite any side-to-side slope of the supporting surface.

In another embodiment of the invention, the support structure includes a channel member affixed to the rear of the cabinet and extending transversely thereof. An ellipsoidal member is mounted on the channel member. A flexible track surrounds the ellipsoidal surface and has an internal arcuate surface in engagement with the arcuate outer surface of the ellipsoidal member. The arcuate engaging surfaces permit the track to tilt relative to the channel and the ellipsoidal member to compensate for side-to-side slope of the supporting surface. The flexible track is movable around the ellipsoidal member to facilitate movement of the cabinet over the supporting surface.

DESCRIPTION OF THE PREFERRED EMBODIMENT

Figure 1:
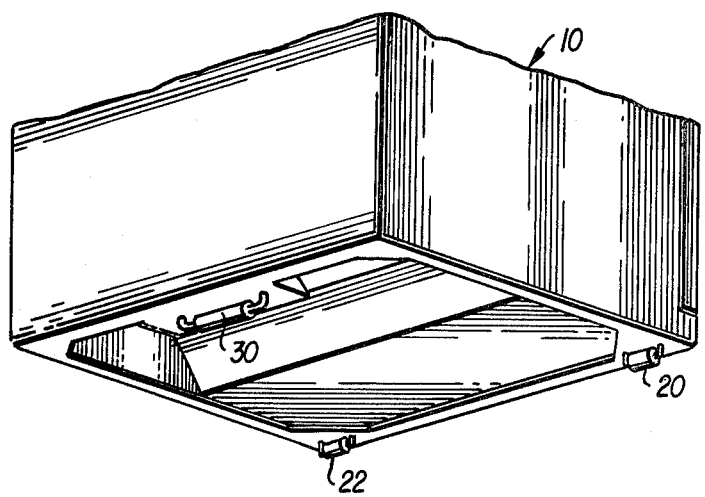
FIG. 1 is a perspective view of the underside of a refrigerator cabinet incorporating the support structure of this invention, as seen from a rear corner.
Figure 2:
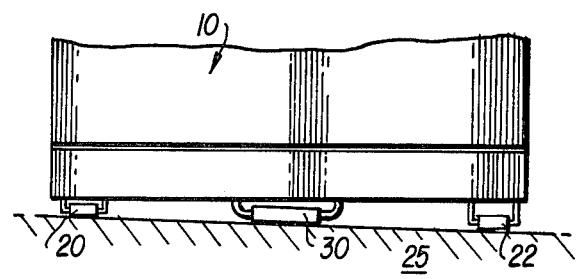
FIG. 2 is a front elevational view of a portion of the refrigerator cabinet of FIG. 1.

Referring first to FIGS. 1 and 2, there is shown a portion of a refrigerator cabinet 10. At the front lower corners of the cabinet 10 are disposed a pair of independently adjustable threaded supports or rollers 20 and 22 for adjusting the front of the cabinet to compensate for slope of the floor or other supporting surface 25. The adjustable rollers 20 and 22 may be of conventional type and have not been shown in detail because they do not form part of the present invention.

Insofar as the front of the refrigerator is concerned, the independently adjustable supports 20 and 22 can be employed to compensate for the slope of the floor 25 both in a back-to-front direction and in a side-to-side direction. Thus, if the floor should slope from back to front of the cabinet, for example, it is merely necessary to adjust both supports 20 and 22 by equal amounts until the cabinet is level. If the floor slopes from side to side, as illustrated in FIG. 2, then the right front support 22 is adjusted to a greater length than the left front support 20 to compensate for the slope of the floor and thereby support the front of the cabinet in a level position. However, in the usual case, the cabinet, such as a refrigerator or washing machine, is placed in a confined space where access to the rear of the cabinet is difficult or impossible. It is therefore unsatisfactory to use manually adjustable supports at the rear of the cabinet because of the difficulty or impossibility of obtaining access to such rear supports to make such manual adjustment. If, on the other hand, two fixed supports were employed at the rear corners, it will be appreciated that on a floor such as that illustrated in FIG. 2 the cabinet will tend to rock on three of the four supports. Alternatively, the cabinet may tend to distort in order to bring all four supports into engagement with the floor. This is particularly so in the case of relatively tall appliances such as refrigerators and significant distortion or twisting of the refrigerator cabinet may result in unsatisfactory sealing of the refrigerator doors.

In order to avoid the above problems, a single support can be employed at the central part of the rear of the cabinet. If the support is small, however, it tends to cause too much concentration of weight on a small floor area where a relatively soft floor covering is employed. This results in a depression which, aside from marring the floor covering, may make movement of the cabinet difficult.

Attempts have been made to overcome this problem by using a support such as a roller of sufficient length to distribute the weight over a larger area. However, where there is a significant side-to-side slope of the floor, as shown in FIG. 2, this fails to solve the problem because only one end of the roller would engage the floor, again resulting in concentration of the weight at the rear of the cabinet on a small area with resultant formation of a depression in the floor covering.

By the present invention, the rear support is formed in a manner which overcomes all of these problems. This is done by providing a roller-type rear support 30 of adequate length which includes provision whereby the roller automatically adjusts itself so as to engage the floor over the entire length of the roller regardless of the slope of the floor.

Figure 3:
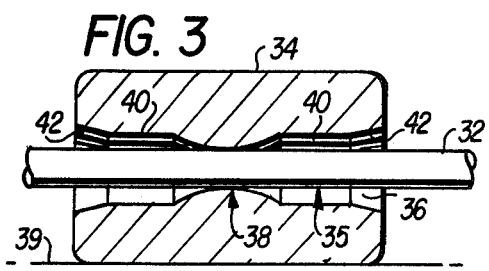
FIG. 3 is an enlarged view of a portion of one preferred embodiment of the invention.
Figure 4:
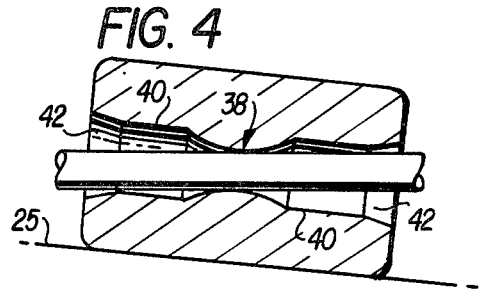
FIG. 4 is a view corresponding to FIG. 3 showing the parts when the cabinet is supported on a sloping surface.

Referring now to FIGS. 3 and 4, which illustrate one embodiment of the invention, the rear support 30 comprises a member or axle 32 which is affixed at its ends to the underside of the cabinet 10 in any suitable manner. Mounted on this axle is an elongated roller 34 having an axial bore 36 for receiving the axle 32. In order to provide a substantial support area and minimize concentration of weight and possible formation of a depression in the floor covering, the roller 34, in a preferred form of the invention, is made of a length between 1/5 and 1/10 of the width of the cabinet.

In order to insure that the roller may tilt relative to the axle so as to engage the floor throughout its length regardless of the slope of the floor, surface 38 of the central portion of the axial bore 36 of the roller 34 is substantially convex in shape; that is, the surface of the central portion of the bore is formed of arcuate shape. The bore on opposite sides 40 of the central portion is cylindrical and of sufficient diameter to permit tilting of the axle 32 without engaging the walls of the bore. At the ends 42, the bore is flared to provide for greater movement of the axle 32 as it tilts. It is the convexity in shape, however, of the surface 38 of the bore 36 which initially permits the roller 34 to tilt, relative to the axle 32, about the point of engagement between the surface 38 of the bore 36 and the surface 35 of the axle 32. While perhaps not clearly visible in FIGS. 3 and 4, the diameter of the bore at the arcuate surface 38 is slightly greater than the diameter of the axle 32 to better facilitate tilting of the roller relative to the axle. A similar clearance is provided in the other embodiments subsequently described, except in FIG. 8.

When the cabinet 10 is placed upon a surface which slopes from side to side, as illustrated in FIG. 2, the front supports 20 and 22 are manually adjustable as shown to compensate for the side-to-side slope of the supporting surface. As the front supports are adjusted to insure that the front of the cabinet 10 is firmly and stably supported in a level position on the sloping surface, the rear support structure 30 automatically adjusts itself such that it as well as the manually adjusted front supports 20 and 22 engage the sloping surface. This can best be seen by referring to FIGS. 3 and 4.

In FIG. 3, that cabinet is resting on a supporting surface 39 which does not slope from side to side and both the axle 32 and the roller 34 are horizontal. In FIG. 4, the axle and roller are illustrated in the relative positions they occupy when the cabinet is resting on a supporting surface 25 which slopes downward from left to right as shown in FIG. 2. It can be seen from FIG. 4 that the arcuate shape of the bore of the roller permits the roller to tilt relative to the axle so that the roller engages the floor along its entire length despite the substantial slope of the floor. Since the roller 34 engages the surface over its entire length, the weight of the rear of the cabinet 10 is substantially uniformly distributed over the entire length of the roller, thereby avoiding any concentration of weight of the rear of the cabinet 10 in any particular area on the supporting surface and thereby minimizing any depression in the surface.

Figure 5:
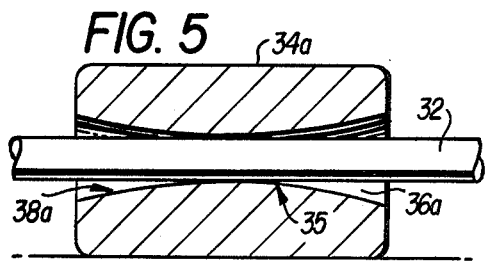
FIGS. 5, 6 and 7 show other embodiments of the support structure according to the invention.

While the particular configuration of the support shown in FIGS. 3 and 4, wherein the bore is of arcuate shape over the central portion of its length, is preferred, other configurations may be utilized to accomplish the levelling of a cabinet, such as a refrigerator, on a supporting surface which slopes from side to side. On such modification is shown in FIG. 5. The axle 32 in FIG. 5 is the same as the axle 32 in FIGS. 3 and 4. However, the roller 34a differs from the roller 34 in that it includes a convex or arcuate surface 38a over the entire length of the bore 36a. In this configuration, the roller 34a tilts relative to the axle 32, about the point of engagement between the surface 38a of the bore 36a and the axle 32 in the same general manner as in the embodiment shown in FIGS. 3 and 4 to accomplish the levelling of the rear of the cabinet 10 to compensate for the side-to-side slope of a supporting surface. The embodiment illustrated in FIGS. 3 and 4 is preferred because the point of engagement between the arcuate surface of the bore and the axle deviates from the center of the bore less than the point of engagement in the embodiment illustrated in FIG. 5. Thus, the weight of the rear of the cabinet tends to be more uniformly distributed by the configuration illustrated in FIGS. 3 and 4 than by the configuration illustrated in FIG. 5.

Figure 6:
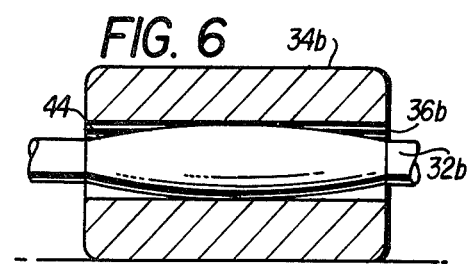

FIG. 6 illustrates another embodiment of the invention wherein the arcuate surface is provided on the axle rather than on the bore of the roller. Thus, in the embodiment of FIG. 6, the axle 32b is formed to include a roller-engaging surface 44 which is of convex or arcuate shape throughout a length corresponding substantially to the length of the roller 34b. The roller 34b in this embodiment is formed with a cylindrical bore 36b throughout its length; that is, it is of uniform diameter throughout its length rather than incorporating a lengthwise arcuate surface as in the embodiment of FIGS. 3, 4 and 5. Because of the arcuate surface 44, the roller 34b in this embodiment may tilt relative to the axle 32b to compensate for side-to-side slope of the floor in the same general manner as in the embodiments previously described.

Figure 7:
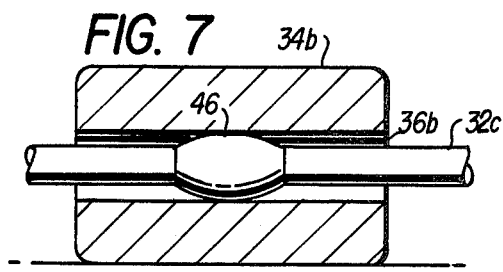

FIG. 7 illustrates still another embodiment of the invention. The roller 34b in FIG. 7 is the same as the roller 34b in FIG. 6. However, the axle 32c differs from the axle 32b in that it is arcuate in shape over a portion thereof corresponding to the central portion of the length of the axial bore 36b rather than being arcuate in shape over a length corresponding substantially to the length of the axial bore 36b as illustrated in FIG. 6. Thus, in the embodiment of FIG. 7, the axle 32c is formed to include a roller-engaging surface 46 which is of convex or arcuate shape over a portion of the axle corresponding to the central portion of the length of the axial bore 36b. In this configuration, the roller 34b may tilt relative to the axle 32c to compensate for the side-to-side slope of the floor in the same general manner as previously described.

Figure 8:
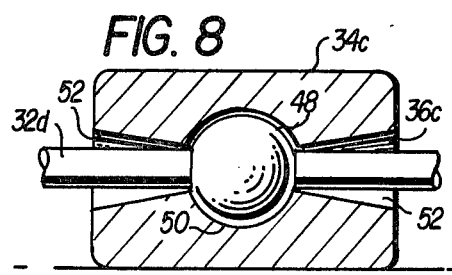
FIG. 8 shows still another embodiment of the support structure according to the invention.

FIG. 8 illustrates still another embodiment of the invention wherein the central portion 50 of the bore 36c and the central portion 48 of the axle 32d have complementary, arcuate surfaces which are spherical in shape. That is, the central portion of the recess and the conforming central portion of the axle cooperate to function as a ball-and-socket joint. The bore on opposite sides 52 of the central portion is flared to provide for greater movement of the axle 32d as it tilts. The spherical surface configuration not only allows the roller 34c to tilt relative to the axle 32d but also provides a larger bearing area than is provided by the configurations shown in FIGS. 3, 4, 5, 6 and 7. Further, this embodiment tends to cause the weight to be distributed uniformly along the length of the roller.

The roller may be assembled on the spherical portion of the axle in a number of ways. For example, the roller may be formed of plastic which is heated to expand the plastic and then snapped over the spherical portion of the axle. Thereafter, the roller, upon cooling, shrinks to achieve the desired assembled relationship with the axle. Alternatively, the roller may be made in two halves which are glued together or otherwise assembled on the axle.

Figure 9:
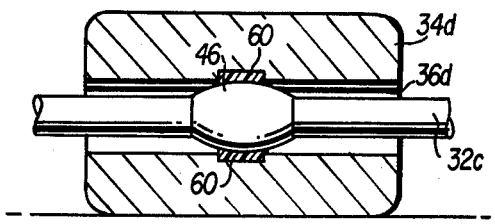
FIG. 9 shows a modification of the support structure of FIG. 7.

FIG. 9 illustrates yet another embodiment of the invention which is a modification of the embodiment shown in FIG. 7. The axle 32c is the same as the axle 32c shown in FIG. 7. However, the roller 34d differs from the roller 34b of FIG. 7 by employing metal inserts 60 in the bore 36b. The inserts 60 comprise two half-annular members received within a recess formed in the bore 36b to provide a substantially continuous surface for engagement with the arcuate surface 46 formed on the axle 32c. The roller 34d may tilt relative to the axle 32c in the same manner as the roller 34b in the embodiment shown in FIG. 7. However, the metal inserts 60 provide a harder and longer-wearing surface for engagement with the arcuate surface 46 than does the plastic surface of the roller 34b of the embodiment shown in FIG. 7.

Figure 10:
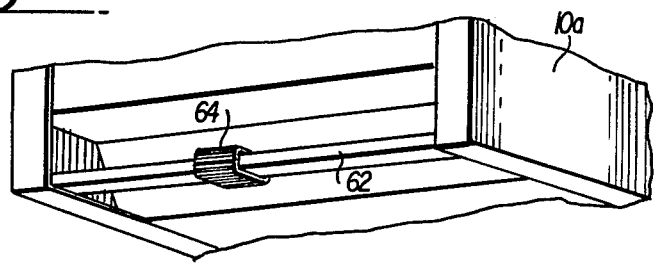
FIG. 10 is a view of the underside of a refrigerator cabinet incorporating still another embodiment of the support structure of the invention.

Another embodiment of the invention is shown in FIGS. 10 through 14. In this embodiment, an elongated member formed as a flexible track having an axial passage therethrough is employed as part of the rear support structure in lieu of the roller utilized in the embodiment previously described. Referring first to FIG. 10, the refrigerator cabinet 10a there illustrated includes at the rear bottom portion thereof a channel member 62 which forms part of the frame of the cabinet and extends between the side walls thereof. A flexible track 64 is mounted for rotation about the channel member 62 and for tilting relatively thereto in a manner shown in detail in FIGS. 11–14.

Referring to these figures, it can be seen that this embodiment includes an internal structure comprising a generally ellipsoidal member 66. The member 66 has a generally oval cross-section from front to back thereof, as best illustrated in the sectional view of FIG. 12. The member 66 is formed from two complementary elements 68 and 70 which fit about and conform to the channel member 62. The elements 68 and 70 are both preferably formed of a suitable plastic material, such as polypropylene, and the elements may be held in assembled relation on the channel member 62 to form the assembled ellipsoidal member 66 in any suitable manner, as by gluing at the adjoining surfaces. When assembled, the elements 68 and 70 provide therebetween a U-shaped slot 71 for receiving the channel member 62. Extensions 73 are provided at the sides of the member 66 to further support the member 66 on the channel member 62.

Figure 11:
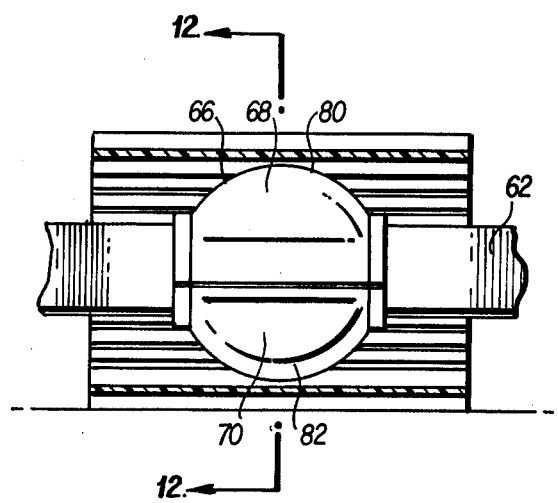
FIG. 11 is an enlarged view, partly in section, illustrating the internal structure of the embodiment shown in FIG. 10.

As best shown in FIG. 11, the upper surface of the element 68 and the corresponding lower surface of the element 70 are formed in arcuate shape. More specifically, both of these surfaces 80 and 82 are formed on a true radius, that is as arcuate surfaces of cylindrical shape, to facilitate tilting of the flexible track relative to the channel member.

Figure 14:
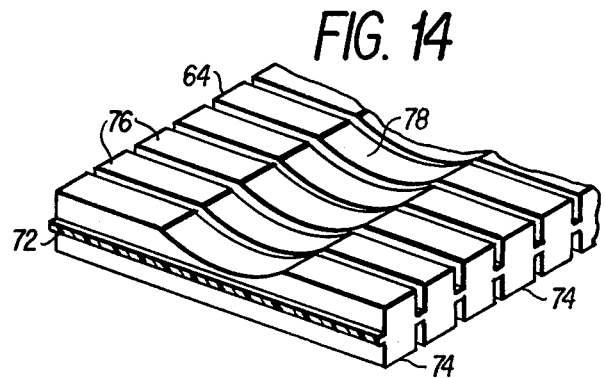
FIG. 14 is a view of a portion of the flexible track employed in the embodiment of FIG. 10.

The flexible track 64, as shown in more detail in FIG. 14, comprises a central web 72 from which treads 74 project on the exterior side thereof. The treads 74 allow easier flexing of the track 64, and additionally provide a gripping means engaging the supporting surface or floor to facilitate movement of the cabinet over the supporting surface. Generally corresponding tread-like elements 76 project from the interior surface of the web. The elements 76 are formed to include an arcuate surface 78 which conforms in shape to the arcuate surfaces 80 and 82 formed on the ellipsoidal member 66, as previously described. The arcuate surface 78 is formed as a true radius, corresponding in shape to the surfaces 80 and 82.

The flexible track 64, which is formed as a continuous belt, is mounted about the ellipsoidal member 66 with the arcuate surface 78 adjacent to the arcuate surfaces 80 and 82. The flexible track is made of a plastic material, such as polypropylene, which is relatively stiff in a lengthwise direction so that the track essentially serves as a roller. However, because it has a relatively thin web 72, the track is relatively flexible in a crosswise direction so that the track may move easily about the ellipsoidal member 66 to facilitate movement of the cabinet 10a. Thus, when a force is exerted on the cabinet 10a to move the cabinet, the track "walks" over the supporting surface and at the same time moves about the ellipsoidal member 66 to facilitate movement of the cabinet 10a. Movement of the track relative to the member 66 may be facilitated by applying grease or powdered lubricant to the engaging surfaces of the member 66 and the flexible track 64.

Figure 12:
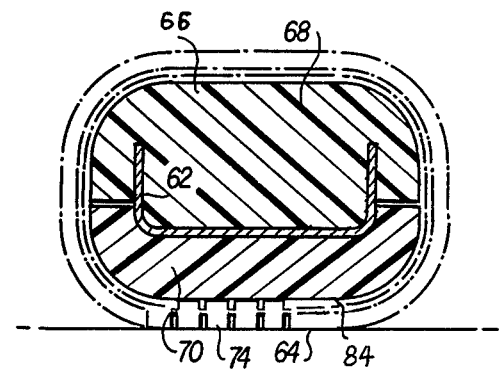
FIG. 12 is a sectional view taken along lines 12—12 in FIG. 11.
Figure 13:
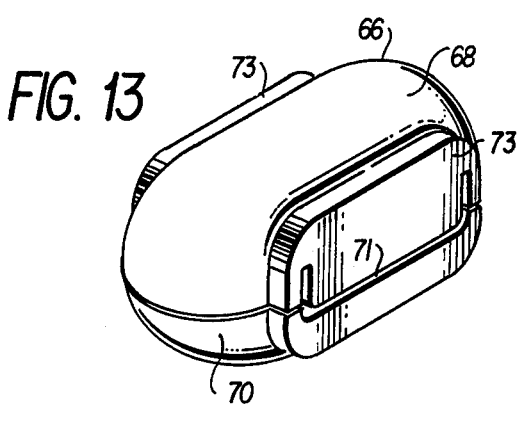
FIG. 13 is an isometric view of the internal structure of the embodiment of FIG. 10.

The track is of a length corresponding to that of the rollers in the embodiments previously described so that there is a substantial length of engagement with the supporting surface. Morever, because the member 66 is of somewhat ellipsoidal shape with a relatively flat, lower surface 84, the track contacts the supporting surface over a substantial area, as best shown in FIG. 12, so that the weight supported thereby is distributed over a substantial area rather than being concentrated in a smaller area, as is the case when a true roller is employed.

Because of the relationship of the arcuate surfaces 80 and 82 on the ellipsoidal member 66 with the arcuate surface 78 on the track 64, the track 64 may tilt relative to the channel member 62 in the same general manner as the rollers in the previous embodiments are able to tilt relative to the axles on which they are mounted. Thus, the track in the present embodiment may tilt so as to engage the supporting surface throughout its length, despite the slope of the supporting surface, in the same manner as the rollers in the embodiments previously described.

The embodiment shown in FIGS. 10–14 discloses an improvement over the flexible track structures described and claimed in a copending application of C. R. Greer and C. W. Denham, Jr., Ser. No. 756,231, filed, Jan. 3, 1977, now U.S. Pat. No 4,092,031, and assigned to the assignee of the present invention.

It is to be understood that the basic levelling of the front of the cabinet 10 is accomplished in a conventional manner by manually adjusting the threaded front supports 20 and 22 in the usual manner. By providing the cabinet with the structure of this invention, the rear of the cabinet is automatically supported in a level position in a manner which insures proper weight distribution of the rear of the cabinet on the rear support structure thereby minimizing any depressions in the supporting surface which would be caused, for example, by concentration of the weight of the cabinet on a limited area of a rear support. It should also be understood that by providing a refrigerator cabinet with the structure of this invention, the cabinet is stably positioned and not susceptible to twisting which might otherwise cause the door of the cabinet to seal improperly. Further, the cabinet does not rock when placed on a sloping surface, and, in the case of cabinets for washing machines, there is no tendency to "walk" during a spinning operation with an unbalanced load.

Further still, by the arrangement of a rear, cylindrical support as described, movement of a cabinet, such as a refrigerator from a confined space, is facilitated.

The flexible track embodiment increases the load bearing area and further acts to prevent concentration of weight on a small floor area, thus minimizing the possibility of the formation of a depression in the floor covering, particularly when a relatively soft floor covering is employed.

While a particular rear cabinet support structure and modifications thereof have been shown and described, other modifications will occur to those skilled in the art. It is intended, therefore, that the invention not be limited to the particular embodiments shown and described and that the appended claims should cover such modifications as fall within the spirit and scope thereof.

What is claimed as new and desired to be secured by Letters Patent of the United States is:

1. A structure for supporting a cabinet on a supporting surface comprising:
    (a) a first member positioned on said cabinet and extending transversely of said cabinet;
    (b) an elongated member having an axial passage therein, said elongated member being mounted on said first member and being rotatable on said first member to facilitate movement of said cabinet; and
    (c) a surface on said elongated member within said passage engaging a surface of said first member, one of said surfaces being of arcuate shape lengthwise of said elongated member to permit tilting of said elongated member relative to said first member, whereby said elongated member is caused to engage the supporting surface along the entire length of said elongated member.

2. A structure for supporting a cabinet on a supporting surface comprising:
    (a) an axle mounted on the underside of said cabinet and extending transversely of said cabinet;
    (b) an elongated roller having an axial bore therein, said roller being mounted on said axle and being rotatable on said axle to facilitate movement of said cabinet; and
    (c) a surface of said axial bore engaging a surface of said axle, one of said surfaces being of arcuate shape lengthwise of said roller to permit tilting of said roller relative to said axle, whereby said roller is caused to engage the supporting surface along the entire length of said roller.

3. A cabinet support structure as recited in claim 2, wherein a central portion of said axial bore is substantially arcuate in shape, said axial bore being cylindrical on opposite sides of said central portion and being flared at the ends thereof.

4. A cabinet support structure as recited in claim 2, wherein said surface of said axial bore is substantially arcuate in shape over the entire length thereof.

5. A cabinet support structure as recited in claim 2, wherein said surface of said axle is substantially arcuate in shape over a length corresponding substantially to the length of said axial bore.

6. A cabinet support structure as recited in claim 2, wherein said axle is arcuate in shape over a portion thereof corresponding to the central portion of the length of said roller.

7. The cabinet support structure as recited in claim 6, and further including:
    (a) a recess formed in the central portion of said bore of said roller in line with the arcuate portion of said axle; and
    (b) a metal insert received in said recess and engageable by said arcuate portion of said axle.

8. The cabinet support structure as recited in claim 2, wherein a central portion of said bore is of spherical shape and a central portion of said axle is of complementary sperhical shape.

9. The cabinet support structure as recited in claim 8, wherein said bore is flared on each side of said spherical portion of said bore.

10. The cabinet support structure as recited in claim 1, wherein:
    (a) said first member comprises a channel member mounted on the cabinet and a generally ellipsoidal member supported on said channel member; and
    (b) said elongated member comprises a flexible track surrounding said ellipsoidal member and movable relative thereto to facilitate movement of the cabinet.

11. The cabinet support structure as recited in claim 10, wherein:
    (a) said ellipsoidal member includes an arcuate surface of shperical shape in a direction lengthwise of said elongated member; and
    (b) said track includes an arcuate surface of spherical shape on the interior thereof engaging the arcuate surface of said ellipsoidal member to permit tilting of said track relative to said channel member.

12. The cabinet support structure as recited in claim 11, wherein said track is formed of polypropylene.

* * * * *